US011593247B2

(12) United States Patent
BenHanokh et al.

(10) Patent No.: US 11,593,247 B2
(45) Date of Patent: Feb. 28, 2023

(54) SYSTEM PERFORMANCE EVALUATION AND ENHANCEMENT IN A SOFTWARE-DEFINED SYSTEM

(71) Applicant: Red Hat, Inc., Raleigh, NC (US)

(72) Inventors: Gabriel Zvi BenHanokh, Tel-Aviv (IL); Joshua Durgin, Canyon County, CA (US)

(73) Assignee: RED HAT, INC., Raleigh, NC (US)

( * ) Notice: Subject to any disclaimer, the term of this patent is extended or adjusted under 35 U.S.C. 154(b) by 89 days.

(21) Appl. No.: 17/337,545

(22) Filed: Jun. 3, 2021

(65) Prior Publication Data

US 2022/0391303 A1 Dec. 8, 2022

(51) Int. Cl.
*G06F 11/34* (2006.01)
*G06F 11/30* (2006.01)
*G06N 20/00* (2019.01)
*H04L 9/40* (2022.01)
*G06K 9/62* (2022.01)
*H04L 67/01* (2022.01)

(52) U.S. Cl.
CPC ...... *G06F 11/3433* (2013.01); *G06F 11/3006* (2013.01); *G06K 9/6218* (2013.01); *G06N 20/00* (2019.01); *H04L 63/0421* (2013.01); *H04L 67/01* (2022.05)

(58) Field of Classification Search
CPC .. H04L 67/01; H04L 63/0421; G06F 11/3433; G06F 11/3006; G06K 9/6218; G06N 20/00
See application file for complete search history.

(56) References Cited

U.S. PATENT DOCUMENTS

| 6,856,979 | B1 * | 2/2005 | Chefalas ........... G06F 16/24566 |
| | | | 707/999.001 |
| 8,395,652 | B1 * | 3/2013 | Chapweske ......... H04L 12/1881 |
| | | | 348/14.05 |
| 9,396,037 | B2 | 7/2016 | Morsi et al. |
| 10,176,004 | B2 | 1/2019 | Gardner et al. |

(Continued)

OTHER PUBLICATIONS

Mohamed, S.H., et al., "A Survey of Big Data Machine Learning Applications Optimization in Cloud Data Centers and Networks," IEEE, 2019,https://arxiv.org/ftp/arxiv/papers/1910/1910.00731.pdf.

(Continued)

*Primary Examiner* — El Hadji M Sall
(74) *Attorney, Agent, or Firm* — Kilpatrick Townsend & Stockton LLP

(57) ABSTRACT

Performance of devices can be evaluated and enhanced in software-defined systems. For example, a computing device can receive, at a server of a software-defined system, a first plurality of properties describing a client system in the software-defined system. The computing device can compare, by the server, the first plurality of properties to additional properties describing at least one additional client system in the software-defined system. The computing device can determine, by the server, an adjustment for the client system based on the comparison and a similarity of the client system to each of the at least one additional client system. The computing device can output, by the server, an indication of the adjustment to the client system.

20 Claims, 3 Drawing Sheets

(56) References Cited

U.S. PATENT DOCUMENTS

| | | |
|---|---|---|
| 10,346,216 B1 | 7/2019 | Yang et al. |
| 10,534,911 B2 | 1/2020 | Brech et al. |
| 10,887,378 B2 | 1/2021 | Decusatis et al. |
| 2017/0005533 A1* | 1/2017 | Zeine .................. H02J 50/80 |
| 2017/0139923 A1* | 5/2017 | Wang .................. G06F 16/583 |
| 2020/0117445 A1* | 4/2020 | Wilson ................ G06F 16/284 |
| 2020/0213206 A1* | 7/2020 | Bracken ............... H04L 63/166 |

OTHER PUBLICATIONS

Liu, G., et al., "NetAlytics: Cloud-Scale Application Performance Monitoring with SDN and NFV," Middleware, 2016, http://grace-liu.github.io/static/papers/16-Middleware-netalytics.pdf.

* cited by examiner

SYSTEM PERFORMANCE EVALUATION AND ENHANCEMENT IN A SOFTWARE-DEFINED SYSTEM

TECHNICAL FIELD

The present disclosure relates generally to software-defined systems. More specifically, but not by way of limitation, this disclosure relates to system performance evaluation and enhancement in a software-defined system.

BACKGROUND

Software-defined systems include software that virtualizes components of an information technology (IT) architecture. For example, compute, network, and storage components of the architecture can be virtualized and automated. Software-defined systems can support multiple client systems, which can each include one or more client devices. The client devices, and thus the client systems, can each be configured differently. Performance of the overall software-defined system can depend on the performance of each client system within the software-defined system.

DETAILED DESCRIPTION

Figure 1:
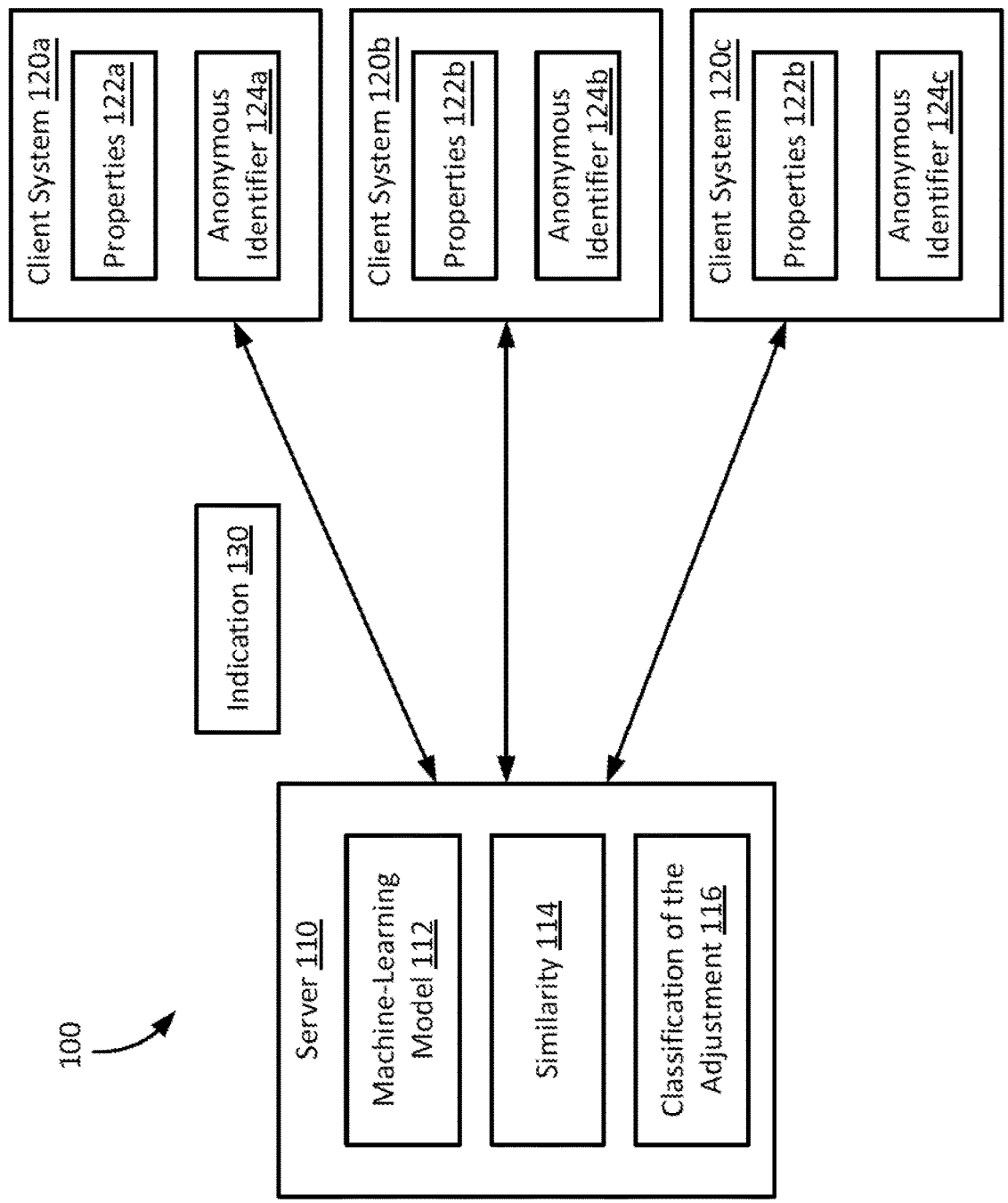
FIG. 1 is a block diagram of an example of a software-defined system for implementing system performance evaluation and enhancement according to some aspects of the present disclosure.

Client devices of client systems in a software-defined system can each have their own configurations. For example, the hardware components and the settings associated with the hardware components can differ between client devices and client systems. Additionally, the workloads the client systems perform can differ between the client systems. Performance of a client device, client system, and ultimately the software-defined system, can be impacted by the hardware, the hardware settings, and the workload performed by the client system. Thus, if a client device or client system is configured such that it performs sub-optimally, the software-defined system may also experience sub-optimal performance.

Some examples of the present disclosure can overcome one or more of the abovementioned problems by providing a system that monitors configurations and performance of client systems to determine adjustments to improve performance of the client systems and the overall system. A server of the system can receive properties describing a client system in the system. The properties can include workload information, configuration information, and performance parameters for the client system. The server can compare the properties to properties of other client systems in the system. Based on the comparison and a similarity of the client system to the other client systems, the server can determine an adjustment for the client system. For example, the server can determine another client system includes similar hardware, but has better performance parameters than the client system. As a result, the server can determine an adjustment for the client system that will cause the properties of the client system to become more similar to the properties of the other client system and improve the performance of the client system. The server may use a machine-learning model to determine the similarity and the adjustment for the client system. Alternatively, the server may include predefined rules for how to adjust the client system based on the configuration, workload, and performance parameters.

As an example, a server of a software-defined system can receive configuration information, workload information, and performance parameters for client system A. The configuration information can indicate that client system A includes a spinning drive, executes write-intensive workloads, and experiences high request response time. The server can determine, that client system B also includes a spinning drive and executes write-intensive workloads, but that client system B experiences a lower request response time. Since client system A and client system B have similar configurations and workload properties, the server can determine how client system A can be adjusted to improve the request response time. The server may determine client system A has a different cache configuration than client system B. The server can then determine client system A can change the configuration of the cache memory to be similar to that of client system B and improve the request response time. The server can then indicate the recommended adjustment to client system A. Client system A can implement the adjustment, which may result in improved performance for client system A and the software-defined system as a whole.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a software-defined system 100 for implementing device performance evaluation and enhancement according to some aspects of the present disclosure. The software-defined system 100 can include a server 110 and client systems 120a-c. The client systems 120a-c can include a single client device or multiple client devices. Examples of the client devices can include desktop computers, laptops, mobile phones, etc. The server 110 can communicate with the client systems 120a-c over a network, such as a local area network (LAN) or the Internet. The server 110 may assign each of the client systems 120a-c an anonymous identifier 124a-c, such that an identity associated with each of the client systems 120a-c is not maintained in the server 110 for privacy purposes.

In some examples, the server 110 can receive properties 122a describing the client system 120a. The properties 122a can include configuration information, workload information, and one or more performance parameters of the client system 120a. Examples of the configuration information can include information about a central processing unit (CPU), a random access memory (RAM), drives, etc. of the client system 120a. Examples of the workload information can include whether the client system 120a performs mostly random accesses or sequential accesses, whether the client system 120a performs more read intensive or write intensive operations, a size of input/output operations performed by the client system 120a, etc. Examples of the performance parameters can include stat-counters such as cache miss and cache hit counters, latency measurements, load measurements, page-in and page-out information, fragmentation measurements, etc.

The server 110 can receive the properties 122a in response to a request for the properties 122a received by the client system 120a from the server 110. The request may be sent to the client system 120a once, or at regular intervals, such as every twenty-four hours. Alternatively, a user of the client system 120a may request the properties 122a be sent to the server 110 for processing and analysis.

In some examples, the server 110 can determine a performance of the client system 120a based on the properties 122a. The server 110 can receive properties 122b-c for the client systems 120b-c, which can include configuration information, workload information, and performance parameters for the respective client system of the client systems 120b-c. The server 110 may store the properties 122b-c in a database (not shown) prior to receiving the properties 122a from the client system 120a. The server 110 can then compare the properties 122a to the properties 122b-c. The properties 122b-c can indicate a high performance of the client systems 120b-c. Thus, by comparing the properties 122a to the properties 122b-c, the server 110 can determine a performance of the client system 120a and possible adjustments for the client system 120a that can improve performance of the client system 120a.

The server 110 may only compare the properties 122a of the client system 120a to properties associated with client systems that are similar to the client system 120a. The server 110 can determine a similarity 114 of the client system 120a to other client systems. A client system can be considered similar to the client system 120a if the configuration information and the workload information of the properties for the client system are similar to the configuration information and the workload information for the properties 122a for the client system 120a. For example, the server 110 can determine the properties 122a and the properties 122b indicate that the client system 120a and the client system 120b have the same configuration and both include write-intensive workloads, but the properties 122c indicate that the client system 120c has a different configuration and includes read-intensive workloads. As a result, the server 110 can compare the properties 122a to the properties 122b and not the properties 122c to determine the performance and potential adjustments of the client system 120. The server 110 may determine a predefined number of client systems, such as five client systems, that have the similarity 114 that is the highest compared to the client system 120a and compare the properties of each client system of the predefined number of client systems to the properties 122a. The server 110 may determine the similarity 114 using a clustering algorithm, such as a K-Means algorithm, a hierarchical clustering algorithm, or an unsupervised machine-learning model. The clustering algorithm can group client systems based on a similarity of the properties for each of the client systems. The similarity 114 can then be determined based on the grouping of the client systems.

In some examples, the server 110 can determine an adjustment for the client system 120a based on the comparison and the similarity 114. For example, the server 110 may determine that the client system 120a has a high latency, while the client system 120b has a low latency. The server 110 can then determine which configuration information in the properties 122a-b are different, and which of these may contribute to latency. For example network settings for the client system 120a and the client system 120b may be different, and the server 110 can determine network settings can contribute to latency. The server 110 can then determine the client system 120a should have similar network settings as the client system 120b to reduce the latency and improve performance. The adjustment determined by the server 110 can include changes that can be implemented to the network settings of the client system 120a so that they match the network settings of the client system 120b.

The server 110 may include rules for determining the adjustment. For example, a particular configuration experiencing a certain performance may correspond to a particular adjustment. Examples of the rules can include a low cache-hit-ratio corresponding to an adjustment of adding more RAM and stat-counters indicating a CPU bottleneck corresponding to an adjustment of adding more power. The rules may additionally include constraints for the adjustment determination. For example, the rules can indicate that an adjustment that is expected to improve performance should not be recommended if it is expected to diminish stability of the client system.

The server 110 may use a machine-learning model 112 to determine the adjustment for the client system 120a. The machine-learning model 112 may include the clustering algorithm for determining which client systems are similar to each other. Additionally or alternatively, the machine-learning model 112 may include a decision tree, a feedforward neural network, a convolutional neural network, etc. for determining the adjustment. The machine-learning model 112 can be trained based on properties of multiple client systems and adjustments for improving the performance of the client systems. For example, during training, the machine-learning model 112 can determine an adjustment for a client system and a user can indicate to the machine-learning model 112 whether the adjustment is a beneficial adjustment for the client system. The machine-learning model 112 can learn from the user indications about which adjustments should be implemented for client systems experiencing particular performance problems. The server 110 may alternatively automatically request updated performance parameters after the adjustment is implemented and compare the updated performance parameters to the original performance parameters to determine whether the adjustment was beneficial.

In some examples, the machine-learning model 112 can learn which adjustments to recommend for a client system based on previous adjustment recommendations. For example, the server 110 can receive feedback about a recommended adjustment to inform subsequent determinations. As one particular example, the machine-learning model 112 can determine the client system 120a is to adjust its network settings to reduce latency. The client system 120a can then implement the adjustment based on the determination by the machine-learning model 112. The server 110 can then monitor the client system 120a to determine a classification of the adjustment 116. The server 110 can classify the adjustment in a first way (e.g., "good") if the adjustment improved performance of the client system 120a and the server 110 can classify the adjustment in a second way (e.g., "bad") if the adjustment did not improve performance of the client system 120a. If the adjustment is classified as "good", the server 110 can recommend the same adjustment for other client systems that have similar properties as the client system 120a and experiencing high latency. If the adjustment is classified as "bad", the server 110 can determine the adjustment is not to be recommended to other client systems with similar properties as the client system 120a that are experiencing high latency. The server 110 can also automatically rollback the adjustment if it is determined to not beneficial, such that the original properties of the client system 120*a* are restored.

An indication 130 of the determined adjustment can be output by the server 110 to the client system 120*a*. The client system 120*a* may automatically implement the adjustment based on the indication 130, or a user of the client system 120*a* may review the indication 130 and determine how to adjust the properties 122*a*. The indication 130 may also include a report of a comparison between the properties 122*a* for the client system 120*a* and the properties 122*b-c* for the client systems 120*b-c*. The report can include an average, median, or percentile for each property of the properties 122*a* with respect to the properties 122*a-c*. The report may be usable by a user to determine the adjustment for the client system 120*a*.

Prior to transmitting the indication 130 to the client system 120*a*, the server 110 may test the adjustment to determine an efficacy of it in improving performance. To do this, the server 110 can generate a new client system and configure the new client system to mimic the properties 122*a* of the client system 120*a* with the adjustment. The server 110 can then monitor the new client system to determine if the adjustment improves the performance compared to the client system 120*a*. If so, the server 110 can determine the adjustment should be implemented in the client system 120*a* and transmit the indication 130 of the adjustment to the client system 120*a*.

FIG. 1 is illustrative and non-limiting. Other examples may include more components, fewer components, different components, or a different arrangement of the components shown in FIG. 1. For example, although the software-defined system 100 includes three client systems in the example of FIG. 1, the software-defined system 100 may include a smaller or larger number of client systems in other examples.

Figure 2:
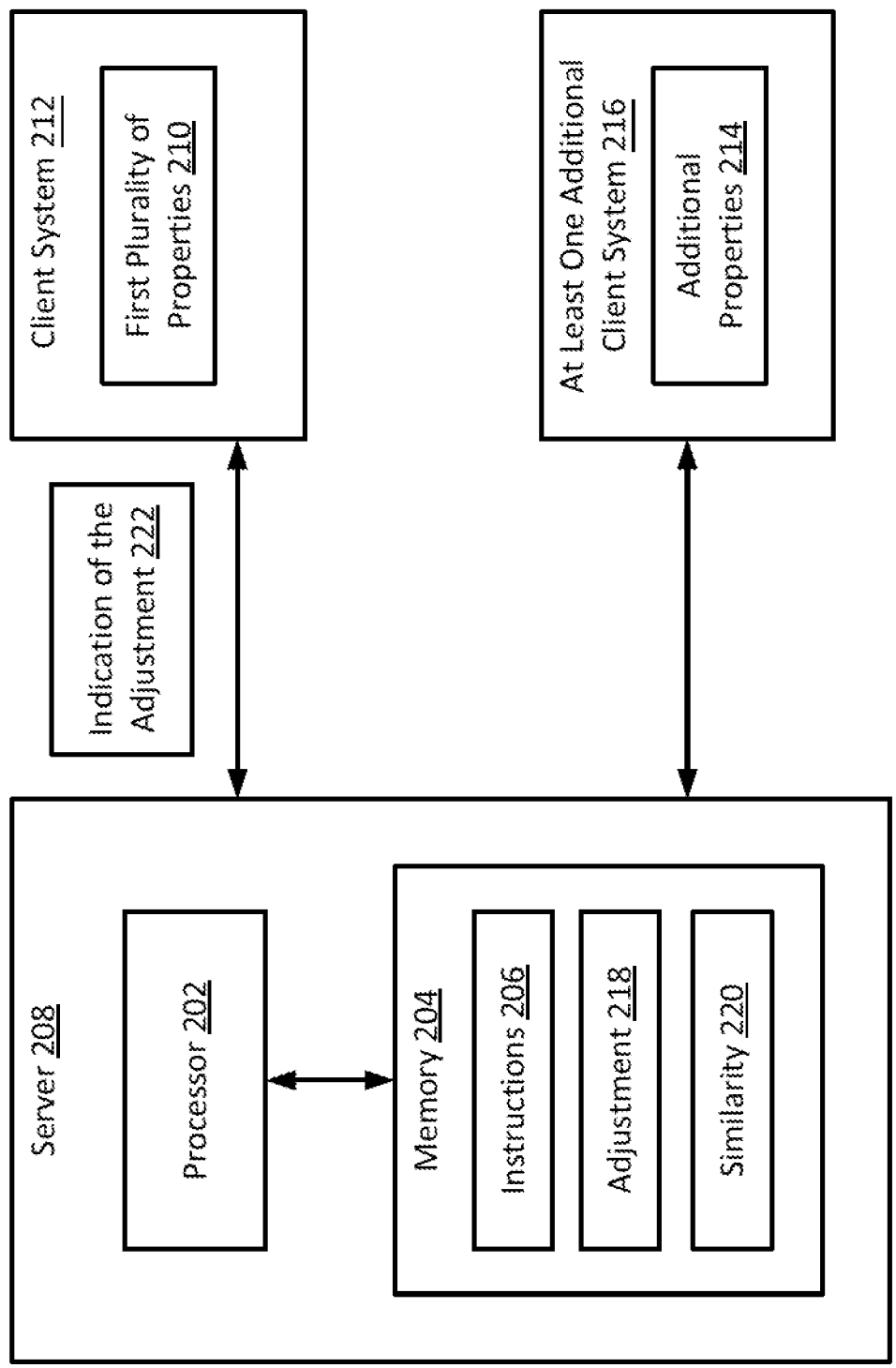
FIG. 2 is a block diagram of another example of a software-defined system for implementing system performance evaluation and enhancement according to some aspects of the present disclosure.

FIG. 2 is a block diagram of another example of a software-defined system for implementing device performance evaluation and enhancement according to some aspects of the present disclosure. The software-defined system 200 includes a processor 202 and a memory 204. The memory 204 is communicatively coupled to the processor 202. The processor 202 may be part of a server, such as the server 110 in FIG. 1.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 may include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a config- ured processor, optical storage, or any other medium from which a computer processor can read the instructions 206.

In some examples, the processor 202 can execute the instructions 206 to perform operations. For example, the processor 202 can receive, at the server 208 of the software-defined system 200, a first plurality of properties 210 describing a client system 212 in the software-defined system 200. The first plurality of properties 210 can include configuration information, workload information, and at least one performance parameter for the client system 212. The processor 202 can compare, by the server 208, the first plurality of properties 210 to additional properties 214 describing at least one additional client system 216 in the software-defined system 200. The processor 202 can determine, by the server 208, an adjustment 218 for the client system 212 based on the comparison and a similarity 220 of the client system 212 to each of the at least one additional client system 216. The processor 202 may apply a machine-learning model to the first plurality of properties 210 and the additional properties 214 to determine the adjustment 218 or the similarity 220. The processor 202 can output, by the server 208, an indication of the adjustment 222 to the client system 212. The client system 212 may automatically implement the adjustment 218, or a user may analyze the indication of the adjustment 222 to determine which changes to make to the first plurality of properties 210. This can allow the client system 212 to adopt properties that provide better performance based on properties of other client systems that are similar to the client system 212 and experiencing better performance.

Figure 3:
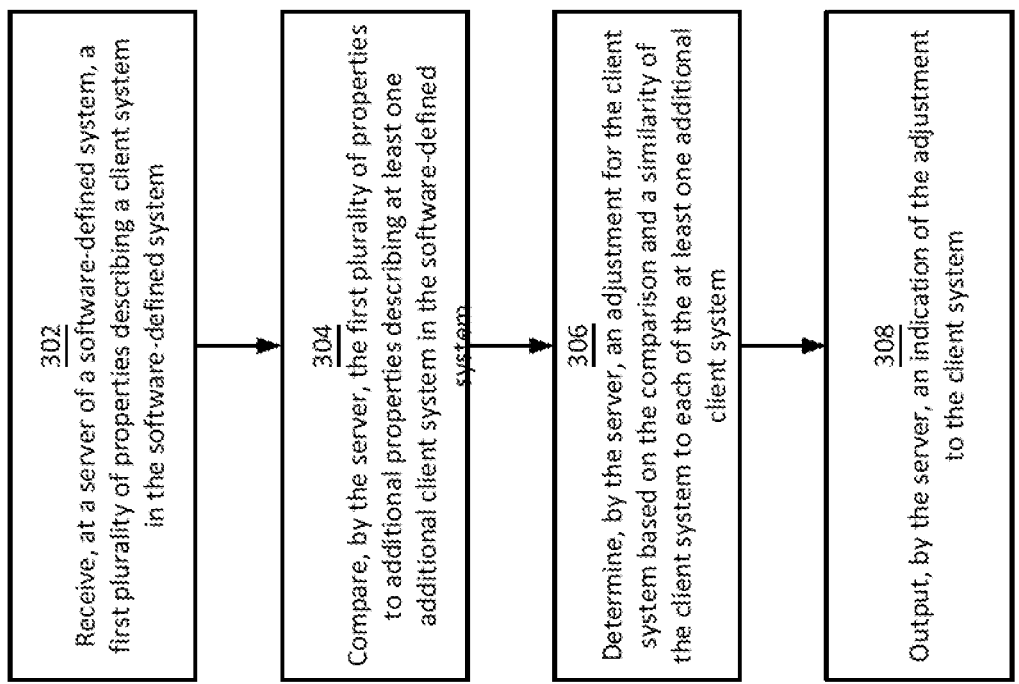
FIG. 3 is a flowchart of a process for implementing system performance evaluation and enhancement in a software-defined system according to some aspects of the present disclosure.

The processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processor 202 can receive, at a server 208 of a software-defined system 200, a first plurality of properties 210 describing a client system 212 in the software-defined system 200. The first plurality of properties 210 can include configuration information, workload information, and performance parameters for the client system 212.

In block 304, the processor 202 can compare, by the server 208, the first plurality of properties 210 to additional properties 214 describing at least one additional client system 216 in the software-defined system 200. The processor 202 can determine a similarity 220 between the client system 212 and each client system of the at least one addition client system 216 based on the comparison. For example, configuration information and workload information for the client system 212 and the at least one additional client system 216 can be used to determine the similarity 220. In some examples, the processor 202 may use a clustering algorithm to determine the similarity 220.

In block 306, the processor 202 can determine, by the server 208, an adjustment 218 for the client system 212 based on the comparison and the similarity 220 of the client system 212 to each of the at least one additional client system 216. The adjustment 218 can be a change to the client system 212 that is expected to improve performance of the client system 212. The adjustment 218 can include an addition of hardware, a configuration of a cache, a change in an allocation of CPU to different hardware of the client system 212, a change in an allocation of memory to different hardware of the client system 212, or a combination thereof. The processor 202 may perform a rules-based determination for the adjustment 218, or may provide the first plurality of properties 210 to a machine-learning model to determine the adjustment 218 based on the additional properties 214.

In block 308, the processor 202 can output, by the server 208, an indication of the adjustment 222 to the client system 212. The processor 202 can output the indication of the adjustment 222 for causing the client system 212 to automatically implement the adjustment 218. Alternatively, the indication of the adjustment 222 may include a report of the first plurality of properties 210 compared to the additional properties 214 with a recommendation of the adjustment 218. A user can review the report and implement some or all of the adjustment 218. Using other client systems in a software-defined system to inform performance-enhancing adjustments for a client system can lead to improved performance for each client system individually the system as a whole.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

What is claimed is:

1. A system comprising:
   a processor; and
   a memory including instructions that are executable by the processor for causing the processor to:
      receive, at a server of a software-defined system, a first plurality of properties describing a client system in the software-defined system;
      compare, by the server, the first plurality of properties to additional properties describing at least one additional client system in the software-defined system;
      determine, by the server, an adjustment for the client system based on the comparison and a similarity of the client system to each of the at least one additional client system; and
      output, by the server, an indication of the adjustment to the client system.

2. The system of claim 1, wherein the memory further includes instructions that are executable by the processor for causing the processor to output the indication for causing the client system to automatically implement the adjustment.

3. The system of claim 1, wherein the memory further includes instructions that are executable by the processor for causing the processor to determine the adjustment by providing the first plurality of properties and the additional properties to a machine-learning model.

4. The system of claim 1, wherein the memory further includes instructions that are executable by the processor for causing the processor to:
   assign an anonymous identifier to the client system and each of the at least one additional client system prior to receiving the first plurality of properties and the additional properties.

5. The system of claim 1, wherein the first plurality of properties comprises configuration information, workload information, and at least one performance parameter for the client system.

6. The system of claim 1, wherein the memory further includes instructions that are executable by the processor for causing the processor to determine the similarity of the client system to each of the at least one additional client system by applying a clustering algorithm to the first plurality of properties and the additional properties.

7. The system of claim 1, wherein the memory further includes instructions that are executable by the processor for causing the processor to:
   monitor the client system subsequent to the client system implementing the adjustment; and
   determine a classification of the adjustment for a subsequent adjustment determination for another client system.

8. A method comprising:
   receiving, at a server of a software-defined system, a first plurality of properties describing a client system in the software-defined system;
   comparing, by the server, the first plurality of properties to additional properties describing at least one additional client system in the software-defined system;
   determining, by the server, an adjustment for the client system based on the comparison and a similarity of the client system to each of the at least one additional client system; and
   outputting, by the server, an indication of the adjustment to the client system.

9. The method of claim 8, further comprising:
   outputting the indication for causing the client system to automatically implement the adjustment.

10. The method of claim 8, further comprising:
    determining the adjustment by providing the first plurality of properties and the additional properties to a machine-learning model.

11. The method of claim 8, further comprising:
    assigning an anonymous identifier to the client system and each of the at least one additional client system prior to receiving the first plurality of properties and the additional properties.

12. The method of claim 8, wherein the first plurality of properties comprises configuration information, workload information, and at least one performance parameter for the client system.

13. The method of claim 8, further comprising:
    determining the similarity of the client system to each of the at least one additional client system by applying a clustering algorithm to the first plurality of properties and the additional properties.

14. The method of claim 8, further comprising:
    monitoring the client system subsequent to the client system implementing the adjustment; and
    determining a classification of the adjustment for a subsequent adjustment determination for another client system.

15. A non-transitory computer-readable medium comprising program code that is executable by a processor for causing the processor to:
    receive, at a server of a software-defined system, a first plurality of properties describing a client system in the software-defined system;
    compare, by the server, the first plurality of properties to additional properties describing at least one additional client system in the software-defined system;
    determine, by the server, an adjustment for the client system based on the comparison and a similarity of the client system to each of the at least one additional client system; and
    output, by the server, an indication of the adjustment to the client system.

16. The non-transitory computer-readable medium of claim 15, further comprising program code that is executable by the processor for causing the processor to output the indication for causing the client system to automatically implement the adjustment.

17. The non-transitory computer-readable medium of claim 15, further comprising program code that is executable by the processor for causing the processor to determine the adjustment by providing the first plurality of properties and the additional properties to a machine-learning model.

18. The non-transitory computer-readable medium of claim 15, further comprising program code that is executable by the processor for causing the processor to:
   assign an anonymous identifier to the client system and each of the at least one additional client system prior to receiving the first plurality of properties and the additional properties.

19. The non-transitory computer-readable medium of claim 15, further comprising program code that is executable by the processor for causing the processor to determine the similarity of the client system to each of the at least one additional client system by applying a clustering algorithm to the first plurality of properties and the additional properties.

20. The non-transitory computer-readable medium of claim 15, further comprising program code that is executable by the processor for causing the processor to:
   monitor the client system subsequent to the client system implementing the adjustment; and
   determine a classification of the adjustment for a subsequent adjustment determination for another client system.

* * * * *